CONDITION-RESPONSIVE SYSTEM FOR IMPRESSING DISTINCTIVE FREQUENCY ALARM TONE ON TRANSMISSION LINE
Filed Dec. 14, 1964

INVENTORS.
Peter Miller
Maurice Rusnak
William Miller
By Silverman & Cass
ATTORNEYS.

3,357,009

CONDITION-RESPONSIVE SYSTEM FOR IMPRESSING DISTINCTIVE FREQUENCY ALARM TONE ON TRANSMISSION LINE

Maurice Rusnak, Chicago, William Miller, Skokie, and Peter Miller, Chicago, Ill.; said Rusnak assignor to Peter Miller and William Miller, Chicago, Ill.

Filed Dec. 14, 1964, Ser. No. 418,115
5 Claims. (Cl. 340—216)

Figure 2:
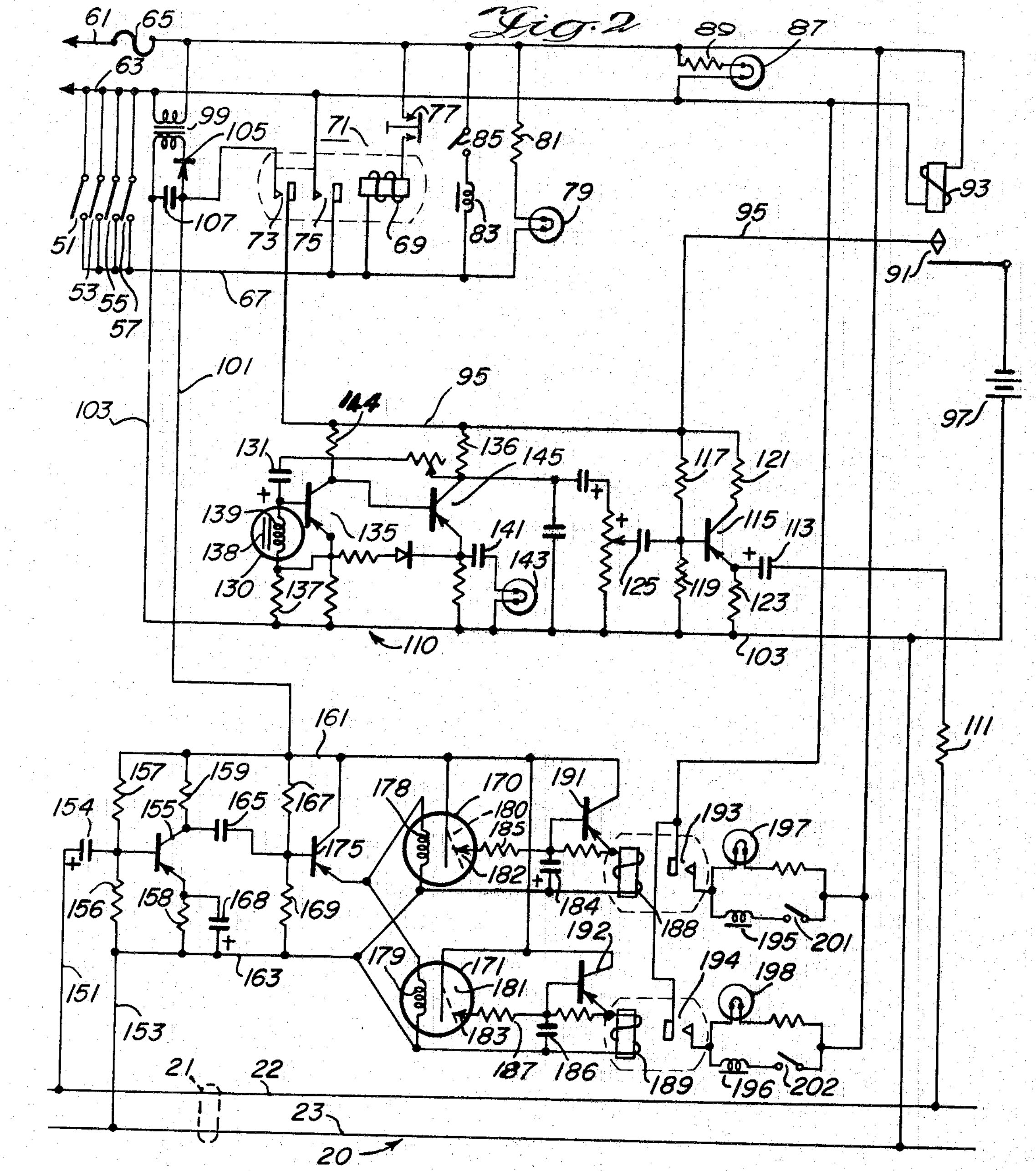

This invention relates to private alarm systems and, more particularly, in an important aspect to an interconnected alarm system adapted for installation in plural premises of associated individuals.

In a prior Patent 3,133,276, granted May 12, 1964 to Peter Miller and William Miller, two of the three present applicants, there was disclosed and claimed a related burglar alarm system. In accordance with this patent there was disclosed an arrangement by which plural selected points at each of plural interconnected stations were arranged when disturbed, to trigger distinctive alarm devices at associated stations.

The selected points at these plural stations were provided with appropriate switches arranged to be closed upon intrusion on the respectively associated station. This intrusion indicating switch closure was transmitted to the other, respectively associated stations by transmission lines. Such interconnected transmission lines, in accordance with this prior patent were conveniently provided informally by the several occupants of the protected premises.

Successful as was this prior apparatus in giving warning of intrusion to such associated parties as would insure prompt definitive action upon receipt of an alarm, still this apparatus left much to be desired in its effective and convenient use.

Thus, the leads interconnecting the several protected stations, by virtue of informal installation, of ten lie open and subject to the vagaries of weather, the casually curious, and the alert intruder. In that patent it was noted that more formal commercial protective systems employed connective leads supplied by the telephone company for connecting each protected station to a central monitoring office. Personnel there on station were made aware of an intrusion, the telephone company provided physically secure transmission lines with no installation trouble for the owner of the protected premises, and police or suitable law enforcing personnel were effectively alerted by the monitoring personnel at a central office.

All these arrangements were, and continue to be effective. Effective, yes, but at a substantial expense. The monitoring personnel must be paid and substantial service charges must be made to support these personnel and the requisite telephone line rental charges.

In accordance with the present invention these disadvantages are ameliorated. An alarm apparatus for each protected station is arranged and connected for giving warning to other privately associated monitoring stations.

At the same time, the physically secure and convenient electrical power line or telephone line may be employed as an interconnecting link but with minimal rental cost or no rental cost at all. This is accomplished by effecting alarm transmission, by a simple, frequency-coded arrangement which allows for transmission of multiple, distinctive alarm signals on a single transmission line.

Accordingly, it is a principal object of the invention to provide a disturbance alarm apparatus adapted for distinctive signalling interconnection with plural remote apparatus by way of conveniently available transmission lines. Thus such transmission may be effected by way of a telephone central station or by way of a central power station.

It is a further object of the invention to provide alarm signalling apparatus adapted for transmitting alarm signals of distinctively selective frequencies.

The invention will be more clear and further objects and inventions will become apparent from a consideration of the following brief description of an illustrative embodiment of the invention shown in the drawings and from a consideration of the appended claims.

Figure 1:
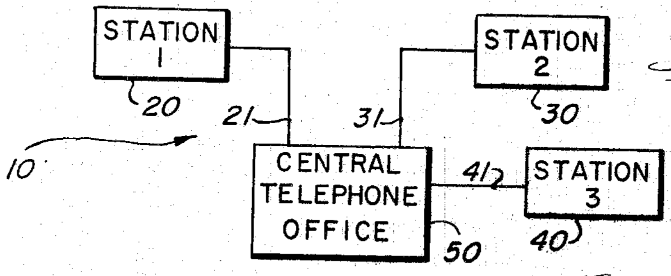

In the drawings:

FIG. 1 is a block diagram of an alarm system incorporating plural alarm units respectively disposed at spaced locations and interconnected through a telephone control office by telephone lines; and FIG. 2 is a schematic diagram of a single alarm apparatus in accordance with the invention for triple incorporation as a principal element in the system of FIG. 1.

The invention comprises generally a bank of switches in one conduction condition, say the open condition, and arranged for operation to an opposite condition, say the closed condition of a respectively associated location. These plural switches associated with alarm signal generating apparatus in accordance with the invention are disposed at selected sensitive positions in a premises to be protected. Thus, such a switch may be temperature sensitive for operating to a closed position in response to a high temperature nearby—this temperature sensitive switch, thus, may be disposed, typically, proximate the furnace of a dwelling unit. Similarly, a moisture responsive sensing switch may be disposed in a basement proximate a sump for operation to a closed position upon sensing of nearby moisture.

And finally a pressure sensitive switch in accordance with the invention may illustratively be disposed adjacent a door or window such that upon unauthorized opening of the door or window, the pressure sensitive switch provides a signal of this opening in the form of a closed conductive path connected across further alarm circuits in accordance with the invention.

Thereafter, this circuit closure signal is arranged for energizing alarm signal generating apparatus in accordance with the invention.

In this alarm signal generating apparatus the disturbance or instrusion energizes an alarm indicating signal such as an audible buzzer and a flashing light and a still further electrical switched signal of preassigned, distinctive recurrence rate (i.e., frequency) for transmission in triggering orientation by way of provided transmission lines to other associated ones of plural alarm stations at removed locations.

These so transmitted distinctive signals are decoded at the receiving alarm station for providing distinctive audible or visual alarms of the disturbance at the transmitting location.

Turning now to the drawings, in the block diagram of FIG. 1 there is shown a complete protection system 10 in which three alarm units 20, 30, 40 are disposed for protecting associated premises, such as homes, and are interconnected through a well known telephone central office by way of telephone transmission lines 21, 31, 41, respectively. Such private telephone lines are available for leasing from the several telephone companies and, provide facile, secure connection between the several alarm units in accordance with the invention. Since leased telephone lines are often most expensive, apparatus in accordance with the invention is adapted for reducing the need for such costly lines to a minimum. It will be recognized, and the invention so comprehends, that these interconnecting transmission lines may as well be simple power supply lines interconnected through the power station. The frequency coded alarm signals of the invention lose nothing of distinctiveness in such power line transmission.

Looking next to the schematic diagram of FIG. 2, there is seen a representative one alarm apparatus 20 at the three shown in FIG. 1. This apparatus 20 includes four open, parallel-connected signalling switches 51, 53, 55, 57 which, upon operation to a closed position, complete a conductive path between leads 61, 63, which include a protective fuse 65, by way of common lead 67. These leads constitute conductors of a two wire alternating current supply lead for connection to a conveniently available, but not shown, source of 115 volt power, such as a wall outlet. The four parallel-connected switches 51–57 normally are of the pressure sensitive type and may, typically, be positioned between a window sash and sill to be operated from the open position illustrated to a closed position when the window is opened, as by an intruder.

Thus, current passes through winding 69 of a double pole, single throw relay 71 for shifting the normally open switches 73, 75 of this relay to a closed position.

The switch 75 thus provides self sustaining energizing of winding 69, which, as shown, is connected across leads 67, 61, by way of push button operated switch 77. Clearly operation of this switch 77 interrupts current flow through relay winding 69 and, absent closure of one of the switches 51–57, allows return of the relay switches 73, 75 to the normal open condition. Connected in parallel between leads 67, 61 are two series arrangements respectively comprising a well known audible signal generating buzzer 83 with a manually operated switch 85 and, second, an indicating lamp 79 with a current limiting resistor 81. A similar lamp 87 and current limiting resistor 89 are connected in the apparatus 20 across power leads 61, 63. Thus the lamp 87 provides positive indication of the energizing of apparatus 20.

Also connected across the power leads 61, 63 is the operating winding 93 of a normally open relay switch 91. This switch, when operated, provides energizing connection from a direct current biasing potential source, battery 97, to lead 95.

A step down transformer 99 is also connected across power leads 61, 63 for providing therefrom reduced direct, operating voltage to loads 101, 103 by way of retifier 105. Filter capacitor 107 is connected in series with rectifier 105 across the secondary winding of transformer 99. This filter capacitor 107 operates in conjunction with rectifier 105 and illustrated circuit associated resistors to provide a reduced, operating direct current voltage on leads 101, 103 from step down transformer 99.

This rectified direct current voltage is applied through operated relay switch 73 by way of lead 95. Thus, a voltage is maintained on lead 95 of like potential whether or no leads 61, 63 are energized from the battery 97 with switch 91 closed, the unusual case, or with the switch 91 open as is the normal situation with winding 93 energized by alternating current.

Now the stable (−) and (+) potentials on leads 101, 103 provide energization for alarm signal generating circuit 110. This latter circuit is for providing signals advantageously suitable in accordance with the invention, for transmission by way of transmission line pair 21 to the central telephone office 50 (see FIG. 1) and for reception of signals transmitted through this same office 50 from telephone lines 31, 41.

These several telephone lines actually include lead pairs as represented in FIG. 2 by the pair of leads 22, 23. What may be called, for convenience, the common lead 23 is connected, as shown, to the direct current energized lead 103 and the remaining lead 22, a signal lead, is connected by way of output resistor 111 through coupling capacitor 113 to the emitter electrode of amplifier transistor 115. The base electrode of this transistor is connected by way of series voltage dividing resistors 117, 119 across plus and minus direct current leads 103, 95. The collector and emitter conduction electrodes of this PNP amplifying transistor 115 are connected similarly across leads 95, 103 by way of resistors 121, 123, respectively. Amplified alternating signals developed across emitter resistor 123 from transistor 115 are coupled by way of capacitor 113 to the signal lead 22 of telephone lead pair 21.

Now let us look to the origin and nature of each coupled signals which clearly result from application of an alternating signal to the base electrode of transistor 115 by way of capacitor 125.

It will be recalled that closure of the relay switch 91 results in the establishing lead 95 at a negative potential corresponding to the potential of battery 97.

Thereafter, closure of a representative one switch 51 of plural such switches 51–57 by an intruder establishes closure of both switches 73, 75 of relay 71. Consequently, buzzer 83 and light 79 may locally signal the presence of an intruder at the premises where apparatus 20 is installed. It will be recalled that manual switch 85 may be opened to prevent intruder-warning actuation of audible alarm, buzzer 83, to alert that intruder.

Now with closure of switch 73, a complete circuit path is established from lead 103 by way of resistor 137 and the operating winding of a well known resonant reed relay 130 to the base electrode of amplifier transistor 135 and, thence, through collector resistor 144 and switch 73 to minus lead 101. Shock excitation of the reed 138 by the positive pulse applied to the winding 139 thereof causes vibration of this reed to induce a corresponding oscillatory wave in winding 139 for coupling by way of capacitor 131 and for amplification by way of transistor 135. Thus, this amplified oscillatory wave is coupled for further amplification to transistor 145.

The resonant reed relay 130 is well known in the art being, for example, of the type described by H. B. Dorren and H. C. Rum of Sargent & Greenleaf, Inc. in Electrical Design News for July 1963. This type relay simply comprises a conductive magnetically permeable, vibrator rod disposed for magnetic coupling with an electrical coil. Thus, when excited to motion, this reed induces a voltage in the coil corresponding to the frequency of vibratory movement of the reed.

Now this signal of selectively defined frequency—selectively defined by virtue of the defined vibratory function of reed 138—is coupled through further amplifying transistor 145 to the output transistor 115 for further transmission by the signal lead 22 of lead pair 12.

In the course of transmission through the transistor 145, by circuit elements illustrated, this twice amplified, reed generated oscillatory signal is coupled through capacitor 141 to give controlled conduction by neon lamp 143 which provides a low emitter impedance for minimizing of distortion of the coupled signal.

Now the resulting electrical signal, applied from transistor 115 via the telephone line 21 to central office 50 for transmission further to receiving portions of alarm apparatus 30, 40 at locations associated with the above discussed transmitting portions of apparatus 20, is an accurately and carefully controlled frequency signal in accordance with the vibratory frequency of reed 138 installed at station 20. Thus, this signal of selective frequency, by virtue of the distinctive frequency of reed 138, is distinctively related to the transmitting station 20. Accordingly, the lead pair 22, 23 is rendered capable of translating signals therealong bidirectionally and distinctively to and from the central telephone station 50.

Thus, such frequency distinctive signals are translated along leads 22, 23 for application to the apparatus 20 shown in FIG. 2 from the associated alarm stations 30, 40 by way of the central telephone office 50.

Let us examine in FIG. 2 how these incoming frequency distinctive alarm signals, on transmission line 21, are employed for distinctively triggering alarm signals indicative of that station 30 or 40 whence these alarm signals originated.

Such incoming frequency distinctive signals, corresponding to that signal transmitted from amplifier transistor 115, are applied to leads 151, 153. Assume a signal to be so applied from apparatus 30. This distinctive frequency signal is coupled by way of capacitor 154 to the base electrode of PNP transistor 155 having biasing resistors 156, 157, 158, 159 connected as shown in the base, collector and emitter circuits between output leads 161, 163. An output signal coupling capacitor 165 is connected from the collector electrode of input amplifying transistor 155 to a connection point between resistors 167, 169 which are series connected across leads 161, 163. Filter capacitor 168 is connected to the emitter electrode of input amplifier transistor 155 for providing a stable bias potential thereto.

The one amplified signal between resistors 167, 169 is amplified further in PNP transistor 175 for further concurrent application to operating windings 178, 179 respectively associated with frequency selective vibratory reed decoders 170, 171 of the type manufactured by and disclosed in the aforementioned publication of, Sargent and Greenleaf, Inc. These two decoders respectively define frequency selective amplifying channels for distinctive signals respectively coupled, from left to right for ease of visualization, from stations 30, 40 along lead 21.

Assuming signals of a frequency coherent with the frequency of frequency selective vibratory reeds 180, 181 of these decoders 170, 171 are applied to the aforementioned operating windings from amplifier transistor 175, the reeds 180, 181 of these decoders are driven magnetically to oscillation for closing contacts 182, 183. These contacts 182, 183 are respectively connected in series circuit with charging capacitors 184, 186 by way of resistors 185, 187 to establish a biasing potential thereon through the illustrated connection by way of lead 163 to lead 161. The so established capacitor potential is connected, as shown, to energize operating windings 188, 189 through associated amplifier transistors 191, 192. These operating windings are respectively associated with relays 193, 194 for appropriate energizing of associated distinctive alarm indicating buzzers 195, 196 and lights 197, 198 from the power leads 61, 63 as shown. Each of the noted audible alarm buzzers is provided with a manual disabling switch 201, 202 for the convenience of occupants of premises protected by apparatus 20.

Thus, typically, lamp 197 will be lighted at alarm apparatus unit 20 so long as the reed relay of frequency corresponding to that of decoder 170 is energized at, for example, station 30. Thus, an intrusion at station 30, is distinctively indicated by the remote apparatus 20 by lighting of lamp 197 and the sounding of buzzer 195, should switch 201 be closed.

There has been described one illustrative embodiment of the invention and brief allusion has been made to the fact that the switches 53, 55, 57, 59 may be operated to a closed alarm position by moisture and heat to provide flood and fire warning. It will be clear to those skilled in the art that, within the spirit and scope of the invention, the alarm switches may be rendered sensitive to smoke or suitable associated circuit arrangement may be made to enable alarm activation by opening a conuterpart of these switches. Thus, it is familiar in the burglar alarm art to employ conductive tape arrangements which, when broken, provide an electrical alarm signal of non-conductivity instead of the alarm, conductivity signal provided by closure of any one of the switches 51, 53, 55, 57 shown in FIG. 2.

What is sought to be secured by Letters Patent of the United States is set forth in the appended claims.

1. Alarm apparatus for installation at a premises to be protected and for generating an alarm signal indicative of disturbance at a point on said premises which comprises, a plurality of switch means for respective installation at like plural points in said premises, the switch means of said plurality having a first conductive state and a second, non-conductive state, first and second lead lines adapted for connection to a source of alternating electric power, alarm indicating means, the switch means of said plurality being connected in common from said first lead line to said second lead line by way of said alarm indicating means to energize said indicating means upon shifting of one switch means of said plurailty between said states, a source of direct current biasing potential, first relay means, means operatively biased by said direct current source and operable for generating an electrical signal of frequency distinctive to said apparatus, said first relay means being connected in series circuit with said first and second lines for operation upon connection of said lines to a source of alternating current, and said generating means being responsive to a direct current signal applied thereto for generating said electrical signal at a distinctive frequency, means for applying a direct current signal to said generating means in response to the shifting of a switch means of said plurality between said conduction states and means for applying said distinctive frequency signal to a transmission line, whereby disturbance at a protected point on said premises results in an alarm signal thereat and transmission of a distinctive frequency alarm signal therefrom.

2. Alarm apparatus as set forth in claim 1 and, in combination therewith, a second alarm indicating means, means responsive to an electrical signal of a second distinctive frequency for energizing said second alarm indicating means, and means for connecting said last named responsive means in circuit with said transmission line.

3. Apparatus as set forth in claim 2 wherein said last named electrical signal responsive means comprises, a capacitor, circuit means for energizing said alarm indicating means, a vibratory magnetic metal reed having an actuating inductive coil for establishing a charge on said capacitor in response to current flow through said coil, at a frequency corresponding to the frequency of said reed, and means for applying the voltage on said charged capacitor in controlling relation to said circuit means thereby to operate said alarm indicating means upon occurrence of an electric signal on said transmission line at a frequency corresponding to that of said vibratory reed.

4. Alarm apparatus for installation at each of plural premises to be monitored, said apparatus comprising first and seocnd leads adapted for connection to a source of alternating current and having, in series therewith, an operating winding for an alternating current relay, a common lead, a plurality of switches connected between said first lead and said common lead, said switches being adapted for disposition about the premises to be monitored, the switches of said plurality being normally opened and responsive to a disturbance at a position of switch disposition for operation to a closed position, a relay operating winding connected between said second lead and said common lead for energization from said alternating current source upon closure of a switch of said plurality, a pair of relay switches operative to a closed condition upon energization of said winding, a transformer having a primary winding connected across said first and second leads and a secondary winding having first and second direct current output leads connected thereto, said first output lead including a rectifying diode, means for generating an electrical signal of frequency distinctive to said apparatus, said first relay switch being connected for supplying operating potentials to said last named generating means from said output leads upon closure of said first relay switch, and said second relay switch being connected on closure for maintaining an operating potential across said operating winding, and switch means for interrupting current supply to said operating winding.

5. Apparatus as set forth in claim 4 wherein each apparatus of said plurality comprises vibratory reed means responsive to an electrical signal of a preassigned frequency for generating a control signal, indicating means, connected in circuit with said last named generating means for generating a distinctive indicating signal, means connecting said vibratory reed means in circuit with an associated apparatus by way of a transmission line and said vibratory reed means corresponding in frequency to the frequency of said associated apparatus distinctive frequency signal generating means, whereby reciprocally translated signals on a single transmission line give distinctive alarm indication at each of a disturbance at the other.

References Cited

UNITED STATES PATENTS

| | | | |
|---|---|---|---|
| 2,913,711 | 11/1959 | Polyzou et al. | |
| 3,133,276 | 5/1964 | Miller et al. | 340—276 |
| 3,234,543 | 2/1966 | Thompson et al. | 340—310 X |

JOHN W. CALDWELL, *Primary Examiner.*

J. T. STRATMAN, *Assistant Examiner.*